United States Patent [19]

Nadeau

[11] Patent Number: 4,904,323
[45] Date of Patent: Feb. 27, 1990

[54] MANUFACTURE OF PLASTIC JACKETED STEEL PIPE

[75] Inventor: Serge Nadeau, Montreal, Canada

[73] Assignee: Northern Telecom Limited, Montreal, Canada

[21] Appl. No.: 244,763

[22] Filed: Sep. 15, 1988

[51] Int. Cl.4 .............................................. B29C 47/28
[52] U.S. Cl. .............................. 156/203; 156/244.13; 156/500; 264/173; 264/237; 425/71; 425/97; 425/113; 425/380; 425/461
[58] Field of Search ....................... 264/173, 174, 237; 156/54, 203, 244.13, 244.14, 500; 425/113, 71, 461, 380, 97

[56] References Cited

U.S. PATENT DOCUMENTS

| | | | |
|---|---|---|---|
| 2,616,127 | 11/1952 | Pfeiffer et al. | 425/461 |
| 2,837,764 | 6/1958 | Hallam et al. | 425/71 |
| 3,087,007 | 4/1963 | Jachimowicz | 264/174 |
| 3,323,704 | 6/1967 | Hannis et al. | 425/71 |
| 4,035,211 | 7/1977 | Bill et al. | 156/203 |
| 4,327,248 | 4/1982 | Campbell | 156/203 |
| 4,360,395 | 11/1982 | Suzuki | 156/54 |
| 4,533,421 | 8/1985 | Pattridge | 156/244.24 |
| 4,740,261 | 4/1988 | Moser | 264/173 |
| 4,778,543 | 10/1988 | Pan | 156/203 |

Primary Examiner—Jeffery Thurlow
Attorney, Agent, or Firm—R. J. Austin

[57] ABSTRACT

Making jacketed pipe using metal strip coated with a plastic coating compatible with the jacket material. After the strip is formed into tube by turning over longitudinal edges of the strip, the jacketing material is then extruded onto the tube under an extrusion pressure insufficient to cause tube collapse. This is conveniently done by the known "tubing" process. Subsequent to the extrusion step, the jacket material is subjected to radial inward pressure also insufficient to cause tube collapse. This pressure reduces the outside diameter of the jacket and presses it against the coating on the tube. The inward pressure step is performed while residual heat from extrusion remains at the inner surface of the jacket to fuse the jacket to the plastic coating. Inward pressure is preferably applied by a polishing die.

13 Claims, 2 Drawing Sheets

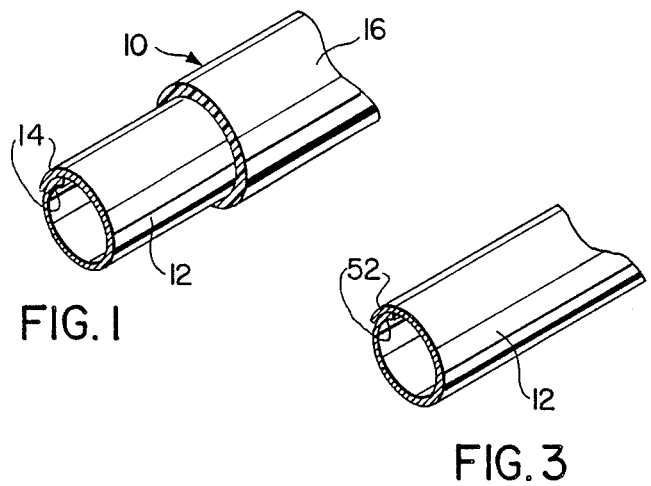
FIG. 1
FIG. 3
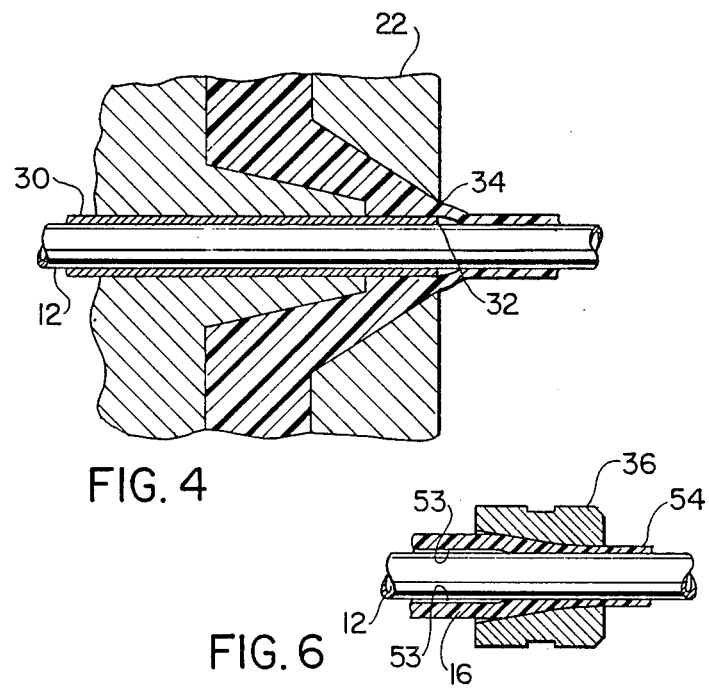
FIG. 4
FIG. 6

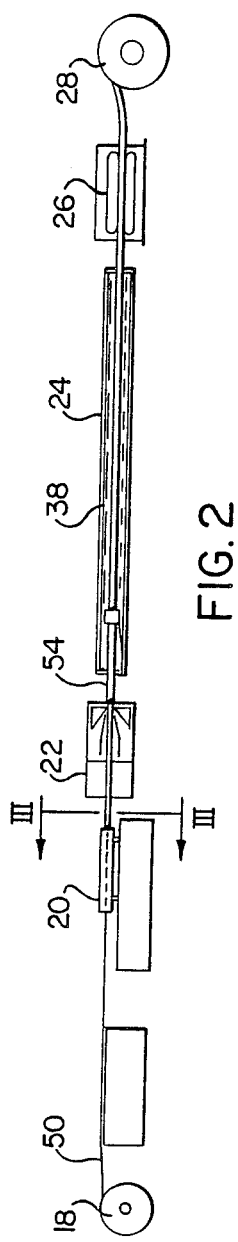
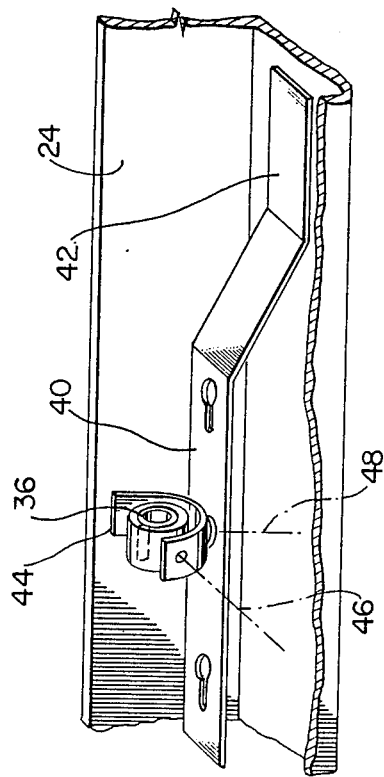

MANUFACTURE OF PLASTIC JACKETED STEEL PIPE

This invention relates to the manufacture of plastic jacketed steel pipe.

In certain industries, plastic jacketed steel pipe is used for various reasons. Such pipe is used in the telephone industry for introducing pressurized air into telephone cables so as to pressurize the cables for the purpose of preventing ingress of moisture. Such pipes are located between an inlet facility to a cable and an air pressure source. Plastic jacketed steel pipe as used in the telecommunications industry will be referred to as "air pipe" throughout the specification.

In the manufacture of air pipe, a metal tube is formed from metal strip, e.g. aluminum, which is coated on both sides with polyolefin. The metal strip is formed into a metal tube by turning longitudinal edges of the strip inwardly towards each other to bring the edges into overlapping relationship and the jacket is extruded around it. During extrusion, the heat involved in the extrusion process is sufficient to soften the outer plastic coating on the metal tube so as to fuse this coating with the jacket thereby securing the jacket to the metal tube. The heat obtained during extrusion is also sufficient to soften and fuse together the opposing plastic coatings located between the overlapped ends of the metal tube. However, the accompanying extrusion pressure is disadvantageous in that without the use of some internal support within the metal tube, the metal tube will collapse under the extrusion pressure. In order to prevent this from happening, internal support is provided by a mandrel which is disposed within the extruder head in the region at which the extrusion pressure is applied. While the use of the mandrel operates successfully in the manufacture of air pipe, it has been found that the constant rubbing of the mandrel against the inner plastic coating on the tube during movement of the tube along the passline, causes transfer of the plastics material onto the mandrel. As a result, the plastics material continually builds up in thickness upon the mandrel. The mandrel thus requires cleaning regularly to make it operational and this results in a high percentage of "down time" of the apparatus.

A further disadvantage which is found with the use of the mandrel relates to the bond strength between the jacket and the outer plastic coating on the metal tube. A peel test is applied between the jacket and the coating upon samples taken from air pipe manufactured by this conventional process. It has been found that the minimum required load for peeling the jacket from the plastic coating is consistently below the minimum requirements set for the test.

The present invention seeks to provide a method of producing a plastic jacketed steel pipe in which the above disadvantages are avoided.

According to one aspect of the present invention, there is provided a method of making pipe having a metal inner layer surrounded by an extruded outer layer comprising: providing a metal strip having on one side a plastic coating compatible with the material of the outer layer to be formed; forming the metal strip into a tube by turning longitudinal edges of the strip inwardly towards each other to bring said edges into overlapping relationship, one with the other and so that the plastic coatings oppose one another at the overlapped edges; forming an assembly of the outer layer and tube by extruding the outer layer onto the metal tube with insufficient extrusion pressure to cause collapse of the tube and with the inside of the tube unsupported; and subsequently subjecting the outer layer to radial inward pressure which is also insufficient to cause collapse of the tube, so as to reduce the outside diameter of the outer layer and press it against the outer plastic coating on the tube with the material at the inner surface of the outer layer having sufficient residual extrusion heat stored therein to cause softening of the outer plastic coating to fuse it to the outer layer and to cause fusion together of the two opposing coatings at the overlapped edges of the tube.

In other words, the method according to the invention is based on the requirement that the adhesion between the outer layer and the plastic coating on the tube takes place after and downstream of the extrusion process itself. Thus, if the extrusion process takes place at a small or insignificant pressure upon the tube, then this pressure will be insufficient to cause mutual overall adhering contact between the outer layer and the outer coating on the tube so that the required degree of bonding between the two materials cannot be obtained. However, with the further steps of the process according to the invention, the assembly of the outer layer and the tube is then moved downstream from the extruder and is subjected to a radial inward pressure which is not related to the pressure at the extrusion step. However, the radial pressure may be applied in such a way that the degree of pressure can be controllably varied whereby collapse of the tube does not result while at the same time a substantial bond is obtained between the jacket and the outer plastic coating on the tube.

It is possible that the radial inward pressure on the outer layer may be provided by fluid pressure, e.g. by passing the assembly through a fluid pressurized chamber. However, in a more practical application, the assembly is drawn through a polishing die. A conventional wire polishing die may be used.

More particularly, the invention provides a method of making a pipe having a metal inner layer surrounded by an extruded outer layer comprising: providing a metal strip having on each side a plastic coating compatible with the material of the outer layer to be formed; forming the metal strip into a tube by turning longitudinal edges of the strip inwardly towards each other to bring said edges into overlapping relationship, one with the other and so that the plastic coatings oppose one another at the overlapped edges; forming an assembly of outer layer and tube by extruding the outer layer onto the metal tube with insufficient extrusion pressure to cause collapse of the tube and with the inside of the tube unsupported; and then passing the assembly through a polishing die without causing collapse of the tube while: (1) ensuring there is no adherence between the outer surface of the outer layer and the die; and (2) reducing the diameter of the outer layer and pressing it against the outer plastic coating on the tube with the material at the inner surface of the outer layer having sufficient residual extrusion heat stored therein to cause softening of the outer plastic coating and fuse it to the jacket and to cause fusion of the two opposing coatings at the overlapped edges of the tube.

The amount of radial pressure applied by the polishing die to the outer layer will depend upon the reduction in diameter of the outer layer as it passes through the die. This reduction may easily be controlled by adjusting extrusion pressure to control the outside diameter of the outer layer during extrusion. Thus, the invention provides a process which is easily controllable by extrusion pressure to provide the required degree of inward pressure at the polishing die. In contrast, if in the conventional method of forming pipe, is modified by elimination of a mandrel, the extrusion pressure cannot be controlled to prevent tube collapse while also effecting an intimate and sufficiently strong fusion bond between outer layer and metal tube. In the case of the present invention it is believed that a substantially small reduction in diameter of the jacket when passing through the polishing die is sufficient to produce the required radial inward pressure to effect adequate fusion bonding of the jacket to the outer plastic coating on the tube. By way of example, in an air pipe having an overall diameter of 0.745 inches as it issues from the polishing die, and with a satisfactory fusion bond the diameter of the outer layer upstream of the polishing die was of the order of 0.748 inches. Hence, a reduction in diameter of 3 mil has been found sufficient to produce the desired bonding results. Control of the extrusion pressure may change the diameter of the outer layer upstream of the polishing die by less than 1 mil if required thereby effecting change in radial pressure to obtain the desired bonding results.

In addition, it has been found that the method according to the invention using a polishing die increases the strength of the bond between the outer layer and the outer coating of plastic upon the tube beyond that which is achievable with the conventional process.

Preferably, according to the invention, there is provided a method of making pipe having a metal inner layer surrounded by an extruded outer layer comprising: providing a metal strip having on each side a plastic coating compatible with the material of the outer layer to be formed; forming the metal strip into a tube by turning longitudinal edges of the strip inwardly towards each other to bring said edges into overlapping relationship, one with the other and so that the plastic coatings oppose one another at the overlapped edges; forming an assembly of tube and outer layer by extruding the outer layer onto the tube with the inside extruded diameter of the outer layer being larger than the outside diameter of the coated metal tube; collapsing the extruded outer layer so that it contacts the outer plastic coating on the tube; passing the assembly of tube and outer layer through a cooling fluid to cool and increase the hardness of the outer surface of the outer layer; and then passing the assembly through a polishing die without causing collapse of the tube while: (1) passing the cooling fluid between the outer layer and the die to act as a lubricant; and (2) reducing the diameter of the outer layer and pressing it against the outer plastic coating on the tube with the material at the inner surface of the outer layer having sufficient residual heat from extrusion stored therein to cause softening of the outer plastic coating to fuse it to the outer layer and to cause fusion of the two opposing coatings at the overlapped edges of the tube.

In the preferred method, no extrusion pressure is applied onto the tube so that collapse of the tube at the extrusion stage of the process is impossible. After extrusion of the outer layer and before entry into the polishing die, the outer layer is collapsed onto the coated tube. This is conveniently achieved by applying tension to the outer layer as by the speed of the downstream reeling apparatus.

Also, the invention includes apparatus for making pipe having a metal inner layer surrounded by an extruded outer layer, the apparatus comprising in a direction downstream along a passline for the pipe; means for forming metal strip into a tube with overlapped edges extending longitudinally of the tube; an extruder having an extruder head having a core tube surrounding a passline for the metal tube, the extruder head having a die orifice for the outer layer surrounding the core tube with a downstream end of the core tube disposed in relation to the die orifice such that the outer layer is extruded onto the metal tube with a larger inside diameter than the outside diameter of the metal tube; tension applying means for causing collapse of the outer layer onto the outer coating on the tube; and means for subjecting the outer layer to radial inward pressure insufficient to cause collapse of the tube.

One embodiment of the invention will now be described by way of example, with reference to the accompanying drawings, in which:

FIG. 1 is an isometric view of a sectioned air pipe made by the method of the embodiment;

FIG. 2 is a side elevational diagrammatic view of apparatus according to the embodiment;

FIG. 3 is a cross-sectional view through a metal tube taken along line III—III in FIG. 2;

FIG. 4 is a cross-sectional view through an extruder head which is an enlargement of part of the apparatus shown in FIG. 2;

FIG. 5 is an isometric view showing part of a cooling trough on larger scale than and forming part of the apparatus of FIG. 2; and FIG. 6 is a cross-sectional view through a polishing die located within the cooling trough in FIG. 5.

As shown in FIG. 1, in the embodiment, an air pipe 10 comprises an aluminum tube 12 formed from strip and having overlapped edges 14. Surrounding the tube 12 is an extruded outer layer or jacket 16 of polyethylene.

To manufacture the air pipe 10, apparatus as shown in FIG. 2 is used. As shown by FIG. 2, this apparatus comprises, in a downstream direction along a passline, a give-up 18 for aluminum tape, a tape forming device 20 an extruder head 22 attached to an extruder not shown, a cooling trough 24, a capstan 26 and an air pipe take-up 28. The give-up 18, the tape forming device 20, capstan 26 and take-up 28 are all of conventional construction and will be described no further.

The extruder head 22 is designed such that when the jacket is extruded onto the tube 12, the jacket has a larger inside diameter than the outside diameter of the tube. To provide for this, the extruder head 22 as shown in FIG. 4, has a core tube 30 extending along the passline for the tube 30, the core tube having a downstream end 32 which lies substantially in alignment with the extrusion orifice 34 of the extruder. This type of extruder head is of conventional construction and is designed for extruding jackets onto cable cores by the well known "tubing" technique. The extruder head will be described no further.

The embodiment also includes a means for subjecting the extruded jacket to a radial inward pressure which is insufficient to collapse the tube. As shown in FIGS. 5 and 6, this radial inward pressure subjecting means comprises a polishing die 36 which is disposed within the cooling trough 24 so as to be immersed within the cooling fluid 38 contained within the trough. The cooling fluid 38 is normally water.

The polishing die 36 may be a conventional wire polishing die. For the avoidance of confusion, a polishing die is not the same structure as a drawing die. A polishing die has a smooth, slightly tapered inner surface and does not have a diamond which is part of the structure of a drawing die. The polishing die is movable laterally and is also pivoted about two axes to enable the polishing die to follow the change in position of the passline of the assembly of tube and jacket moving along the trough. The reason for this movement is to minimize any lateral forces applied by the polishing die upon the jacket material which may not have solidified when it passes through the polishing die and could be subjected to deformation. In this regard, the polishing die is mounted upon a free cantilever arm 40 of a bracket 42 which is secured to the base of the cooling trough 24. The arm 40 is raised above the bottom of the trough so as to be flexed vertically and permit vertical movement of the polishing die dependent upon the vertical displacement of the jacket tube. In addition, the polishing die 36 is mounted within a U-shaped holder 44 about a horizontal pivotal axis 46 and the holder 44 is also mounted to the arm 40 about a vertical axis 48. Thus the polishing die 36 has pivotal movement in two directions to enable the die to follow slight angular changes in the longitudinal axis of the jacketed tube 12 which, it is expected, will not have a true rectilinear axial direction.

In use of the apparatus as shown in FIG. 1, a metal tape 50 is drawn from the give-up 18 by the take-up 28. The metal tape has on each side a thin plastic coating (not shown) which is compatible with the jacket to be formed. The plastic coating is preferably formed of a polyolefin material which may be polyethylene. The coated metal strip is passed through the tape forming device 20 in which it is formed into the tube 12 by the side edges 52 of the tape being turned inwards towards each other so that the edges 14 are in overlapping relationship as shown in FIG. 3. This operation is conventional for forming tube in the manufacture of telecommunications cables. The tube 12 is then drawn through the core tube 30, as shown in FIG. 4, and as it emerges from the core tube 30, the molten plastics material for forming the jacket is extruded around it through the die orifice 34 as shown. As can be seen from FIG. 4, because of the presence of the core tube 30 at the extruder orifice 34, the jacket 16 is extruded onto the tube 12 with an inside diameter which is greater than the outside diameter of the tube. Thus, the tube 12 is not subjected to the extrusion pressures present in the extruder head 22 and no forces are involved which could cause collapse of the tube. It should be noted that as the tube 12 is fed through the core tube 30 and as the jacket is being extruded onto it, the inside of the tube 12 is completely unsupported, i.e. no internal mandrel is present. Nevertheless, as already stated, no collapse of the tube can result.

Although the extruded material upon leaving the extruder head, has a normal extrusion temperature, e.g. between 450° and 500° F., nevertheless, the jacket does not form intimately to the outside of the plastic coated tube 12 because the jacket is not applied to the tube under extrusion pressure. Hence, there is little or no fusion between the jacket material and the plastics coating on the tube 12 after the jacket is formed. This is indicated diagrammatically in FIG. 6, by a nominal gap 53 between sleeve 12 and jacket 16 as they pass together into the polishing die 36. The necessary pressure is however provided by the polishing die 36.

As the assembly 54 of the jacket and metal tube emerges from the extruder head 22, the jacket diameter is reduced by the pulling force exerted by the take-up 28, i.e. by tension applied to the jacket. This causes the jacket to conform more closely to the outside shape of the plastic coated tube 12. The assembly 54 is then passed into the cooling trough 24 and the cooling fluid 38 commences to cool the outer regions of the jacket material. The assembly 54 then passes through the polishing die 36. As can be seen from FIG. 6, as the assembly 52 passes through the polishing die, the jacket is subjected to radial inward pressure which is also insufficient to cause collapse of the tube, but nevertheless causes a slight reduction in the outside diameter of the jacket to press it against the outer plastic coating on the tube and results in fusion bonding to the outer coating. It has been found that the use of a polishing die in this respect provides insufficient pressure to cause tube collapse even though the inside of the tube remains unsupported.

Various controls are required throughout the process to ensure that at the polishing die, the desired result, i.e. bonding of the jacket to the plastic coating on the tube 12, is achieved. One of these controls is concerned with producing the desired relationship of incoming jacket diameter to outgoing jacket diameter to provide sufficient draw down and radial inward pressure to produce the bond. This control is easily maintained by a slight change in the extrusion pressure within the extruder head 22 so as to vary the outside diameter of the jacket as it emerges from the extruder orifice 34. A slight change in extrusion pressure may vary the outside diameter by one or more mil. It has also been found that a small reduction in diameter of the jacket at the polishing die is sufficient for the bonding purpose. For instance, where the outside diameter of the air pipe 10 is required at 0.745 inches as it emerges from the die, then an incoming diameter of 0.748 inches will be sufficient to produce the desired inward pressure. This incoming outside diameter may of course be varied as just discussed by a slight change in extrusion pressure.

Further controls which are required concern the temperature of the jacket material itself. These controls are achieved by a combination of factors, e.g. the temperature of the cooling fluid, the location of the polishing die 36 in the cooling trough 24 from the entrance to the trough, and the throughput speed of the product itself. These controls are provided to ensure that as the assembly passes through the polishing die, there is no adherence between the outer surface of the jacket and the die and also that at the inner surface of the jacket there is still sufficient residual extrusion heat stored therein to cause softening of the outer plastic coating and fuse it to the jacket. This heat should also cause fusion of the two opposing coatings at the overlapped edges 14 of the tube 12.

Hence, as the assembly 54 proceeds through the cooling trough towards the polishing die, the surface of the jacket material becomes slightly hardened under the reduction in temperature and may be formed with a skin. As the assembly 54 proceeds through the polishing die, the cooling fluid lies between the jacket and the die surface as an extremely thin film so as to act as a lubricant. Thus the hardening of the outside of the jacket and the presence of the lubricating cooling fluid is sufficient to prevent destruction or tearing away of the outer regions of the jacket as it passes through the die.

While the invention as highlighted by the embodiment produces a process in which the pressure to create bonding between the jacket and the tube 12 is produced at a different stage in the process from the extrusion step, a surprising result is also achieved. This is that the degree of bond achieved between the jacket and the plastic coating on the outside of the tube is much stronger than has previously been achievable under conventional processes. Conventional strength tests have been used upon samples of air pipe 10 made according to the process according to the embodiment and it has been found that it has been impossible to remove the jacket material from the plastic coating on the tube 12 during these tests. Thus, these tests indicate that the product 16 has a bond which far exceeds the minimum requirement for this product which renders the product far superior to the conventional product made by the conventional process.

It follows, therefore, that not only do the apparatus and method of the invention as described in the embodiment avoid disadvantages in the use of a mandrel, but they also provide a product which is far superior to that which is otherwise producible.

What is claimed is:

1. A method of making pipe having a metal inner layer surrounded by an extruded outer jacket comprising:
   providing a metal strip having on each side a plastic coating compatible with the material of the outer layer to be formed;
   forming the metal strip into a tube by turning longitudinal edges of the strip inwardly toward each other to bring said edges into overlapping relationship, one with the other, and so that the plastic coatings oppose one another at the overlapped edges;
   forming an assembly of outer layer and tube by extruding the outer layer onto the metal tube with insufficient extrusion pressure to cause collapse of the tube and with the inside of the tube unsupported and in which the outer layer is formed so as to surround and be spaced from the tube and is then drawn down towards the tube; and
   subsequently subjecting the drawn down outer layer to radial inward pressure which is also insufficient to cause collapse of the tube, so as to reduce the outside diameter of the outer layer and press it against the outer plastic coating on the tube with the material at the inner surface of the outer layer having sufficient residual extrusion heat stored therein to cause softening of the outer plastic coating to fuse it to the outer layer and to cause fusion together of the two opposing coatings at the overlapped edges of the tube.

2. A method of making pipe having a metal inner layer surrounded by an extruded outer layer comprising:
   providing a metal strip having on each side a plastic coating compatible with the material of the outer layer to be formed;
   forming the metal strip into a tube by turning longitudinal edges of the strip inwardly toward each other to bring said edges into overlapping relationship one with the other, and so that the plastic coatings oppose one another at the overlapped edges;
   forming an assembly of outer layer and tube by extruding the outer layer onto the metal tube with insufficient extrusion pressure to cause collapse of the tube and with the inside of the tube unsupported and in which the outer layer is formed so as to surround and be spaced from the tube and is then drawn down towards the tube; and
   then passing the assembly of the outer layer and tube through a wire polishing die without causing collapse of the tube while:
   (1) ensuring there is no adherence between the outer layer and the die; and
   (2) reducing the diameter of the drawn down outer layer and pressing it against the outer plastic coating on the tube with the material at the inner surface of the outer layer having sufficient residual extrusion heat stored therein to cause softening of the outer plastic coating and fuse it to the outer layer and to cause fusion of the two opposing coatings at the overlapped edges of the tube.

3. A method according to claim 2 comprising ensuring there is no adherence between the outer surface of the outer layer and the die by providing a lubricant between the outer layer and the die.

4. A method according to claim 2 wherein, after extrusion of the outer layer, it is ensured that there is no adherence between the outer layer and the die by passing the assembly through a cooling fluid to increase the hardness of the outer surface of the outer layer, and then passing the assembly through the die with the cooling fluid passing between the outer layer and the die to act as a lubricant.

5. A method of making pipe having a metal inner layer surrounded by an extruded outer layer comprising:
   providing a metal strip having on each side a plastic coating compatible with the material of the outer layer to be formed;
   forming the metal strip into a tube by turning longitudinal edges of the strip inwardly towards each other to being said edges into overlapping relationship, one with the other, and so that the plastic coatings oppose one another at the overlapped edges;
   forming an assembly of tube and outer layer by extruding the outer layer onto the tube with the inside extruded diameter of the outer layer being larger than the outside diameter of the coated metal tube;
   drawing down the extruded outer layer so that it contacts the outer plastic coating on the tube;
   passing the assembly of tube and outer layer through a cooling fluid to cool and increase the hardness of the outer surface of the outer layer; and
   then passing the assembly through a wire polishing die without causing collapse of the tube while:
   (1) passing the cooling fluid between the outer layer and the die to act as a lubricant; and
   (2) reducing the diameter of the drawn down outer layer and pressing it against the outer plastic coating on the tube with the material at the inner surface of the outer layer having sufficient residual heat from extrusion stored therein to cause softening of the outer plastic coating to fuse it to the outer layer and to cause fusion of the two opposing coatings at the overlapped edges of the tube.

6. Apparatus for making pipe having a metal inner layer surrounded by an extruded outer layer, the apparatus comprising, in a downstream direction along a passline for the pipe:

means for forming metal strip into a tube with overlapped edges extending longitudinally of the tube;

an extruder having an extruder head having a core tube surrounding a passline for the metal tube, the extruder head having a die orifice for the outer layer surrounding the core tube with a downstream end of the core tube disposed in relation to the die orifice such that the outer layer is extruded onto the metal tube with a larger inside diameter than the outside diameter of the metal tube;

tension applying means for causing draw down immediately downstream from the extruder, of the outer layer onto the outer coating on the tube; and means for subjecting the drawn down outer layer to radial inward pressure insufficient to cause collapse of the tube.

7. Apparatus according to claim 6 wherein said means for subjecting the outer layer to radial inward pressure comprises a polishing die and a source of fluid is provided to serve as a lubricant between the outer layer and the die to prevent adherence of the outer layer to the die.

8. Apparatus according to claim 6 comprising a cooling trough means located downstream along the passline from the extruder head, for cooling the outer surface of the outer layer.

9. Apparatus according to claim 6 provided with cooling trough located downstream along the passline from the extruder head and said means for subjecting the outer layer to radial inward pressure comprises a polishing die disposed within and downstream from the entrance to the cooling trough whereby when a cooling fluid is held within the cooling trough, the cooling fluid extends through the polishing die.

10. Apparatus according to claim 9 wherein the polishing die is movable laterally within the cooling trough to enable it to follow any lateral displacement of the assembly of metal tube and outer layer from its passline.

11. Apparatus according to claim 10 wherein the polishing die is mounted upon a cantilever arm supported at one end within the cooling trough.

12. Apparatus according to claim 9 wherein the polishing die is freely pivotal about two axes which lie laterally of the passline.

13. Apparatus according to claim 12 wherein the polishing die is pivotally mounted about one axis within a mounting bracket and the mounting bracket is itself pivotally mounted about a second axis within the cooling trough, the second axis being at an angle to the first axis.

* * * * *